United States Patent [19]
Martin et al.

[11] Patent Number: 6,018,943
[45] Date of Patent: Feb. 1, 2000

[54] PROCESS AND ASSEMBLY FOR ELIMINATING NITROGEN OXIDES PRESENT IN EXHAUST GAS, USING NITROGEN OXIDES TRAPPING MEANS

[75] Inventors: Brigitte Martin, Saint Genis Laval; Matthias Bouchez, Meudon, both of France

[73] Assignee: Institut Francais Du Petrole, Rueil-Malmaison, France

[21] Appl. No.: 09/097,809

[22] Filed: Jun. 16, 1998

[30] Foreign Application Priority Data

Jun. 16, 1997 [FR] France ................................. 97-07554

[51] Int. Cl.⁷ ................................. F01N 3/20; F01N 3/28
[52] U.S. Cl. ................................. 60/274; 60/287; 60/297; 60/301
[58] Field of Search ................................. 60/274, 286, 287, 60/297, 301, 299, 300

[56] References Cited

U.S. PATENT DOCUMENTS

| | | | |
|---|---|---|---|
| 5,207,990 | 5/1993 | Sekiya et al. | 60/286 X |
| 5,331,809 | 7/1994 | Takeshima et al. | 60/288 |
| 5,373,696 | 12/1994 | Adamczyk, Jr. et al. | 60/297 X |
| 5,388,406 | 2/1995 | Takeshima et al. | 60/297 |
| 5,398,503 | 3/1995 | Danno et al. | 60/297 X |
| 5,467,594 | 11/1995 | Aoki et al. | 60/297 X |
| 5,501,073 | 3/1996 | Miyashita et al. | 60/284 |
| 5,517,820 | 5/1996 | Kuroda et al. | 60/274 |
| 5,524,433 | 6/1996 | Adamczyk, Jr. et al. | 60/297 X |
| 5,544,482 | 8/1996 | Matsumoto et al. | 60/297 X |
| 5,588,291 | 12/1996 | Maus et al. | 60/274 |
| 5,600,949 | 2/1997 | Kato et al. | 60/286 X |
| 5,603,216 | 2/1997 | Guile et al. | 60/297 X |
| 5,613,359 | 3/1997 | Zahn et al. | 60/274 |
| 5,743,087 | 4/1998 | Zahn et al. | 60/301 |

FOREIGN PATENT DOCUMENTS

| | | |
|---|---|---|
| 0540280 | 5/1993 | European Pat. Off. . |
| 0754841 | 1/1997 | European Pat. Off. . |
| 4319294 | 5/1994 | Germany . |
| 19626836 | 1/1997 | Germany . |

*Primary Examiner*—John E. Ryznic
*Attorney, Agent, or Firm*—Antonelli, Terry, Stout & Kraus, LLP

[57] ABSTRACT

A process and an assembly for eliminating nitrogen oxides ($NO_x$) present in the exhaust gas of a lean-burn diesel or spark-ignition engine, is part of the exhaust line coming from the engine. At least one nitrogen oxides conversion catalyst is placed in the main exhaust line the catalysts having non-coinciding temperature ranges for which the $NO_x$ conversion is below a certain conversion coefficient ($C_{min}$). At least one $NO_x$ trap placed upstream is the conversion catalyst(s) and intended to trap, then to release the nitrogen oxides. At least one line bypassing the main exhaust line contains at least one of the $NO_x$ trap(s); and at least one valve intended to modulate the flow of gas between the bypass line and the main exhaust line is provided so that the $NO_x$ trap(s) can trap the nitrogen oxides, notably when conversion catalyst(s) have a conversion coefficient below a predetermined value ($C_{min}$) and so that said the $NO_x$ trap(s) means (4) can release the nitrogen oxides simultaneously with a conversion.

19 Claims, 2 Drawing Sheets

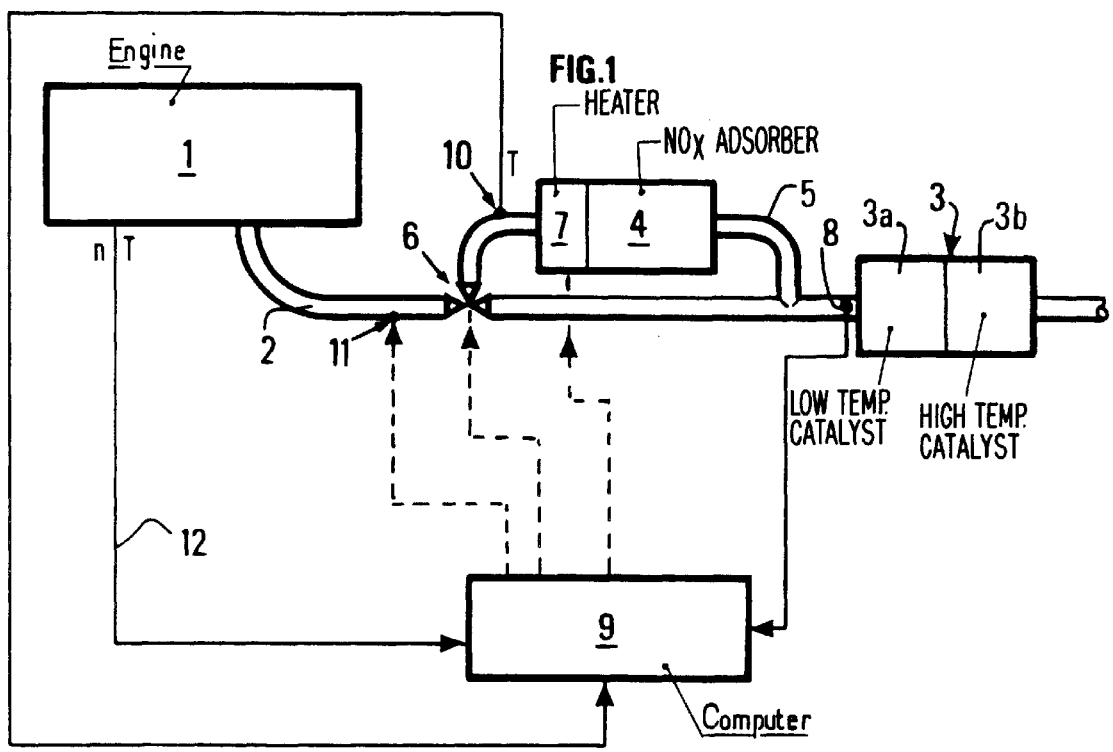
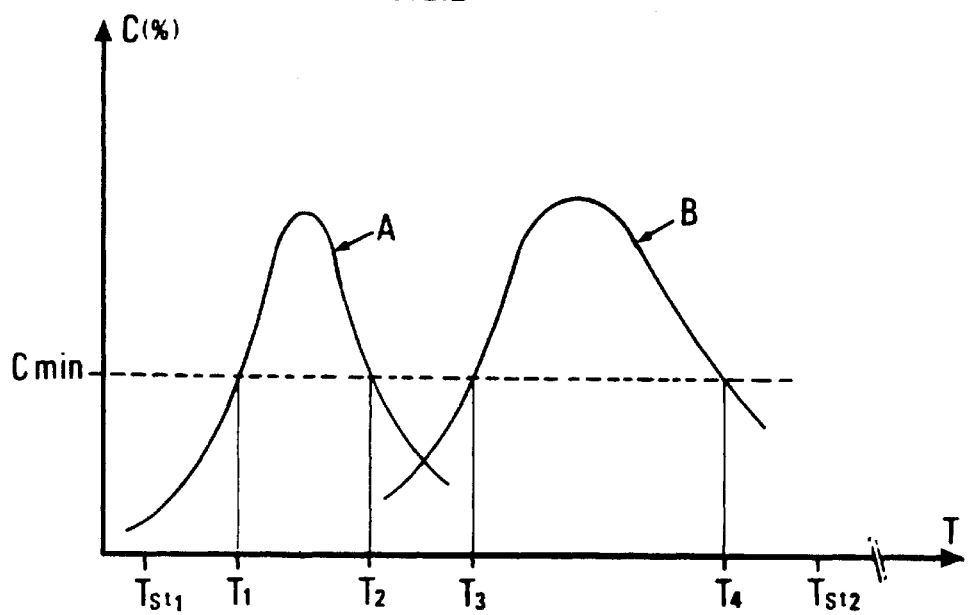

PROCESS AND ASSEMBLY FOR ELIMINATING NITROGEN OXIDES PRESENT IN EXHAUST GAS, USING NITROGEN OXIDES TRAPPING MEANS

FIELD OF THE INVENTION

The present invention relates to the processing of gas discharged at the exhaust of lean-burn diesel and spark-ignition engines.

Such engines emit a certain number of pollutants that have to be eliminated, which must be done all the more effectively because standards become increasingly stringent.

Examples of the most numerous pollutants which have the most harmful effects on the environment are nitrogen oxides.

BACKGROUND OF THE INVENTION

It is well-known to eliminate this type of pollutants by passing the exhaust gas through catalysts (referred to as DeNO$_x$ catalysts) intended for nitrogen oxides conversion. The known catalysts being active within a given temperature range, several catalysts having different formulations, i.e. different activity ranges, may be placed in the catalytic muffler. The sphere of action of the catalytic elements is thus extended. However, in this context, a problem comes up when the exhaust gas is not, at the level of the catalyst(s), within a temperature range for which conversion of the nitrogen oxides is sufficient.

More precisely, a problem comes up when a first catalyst is active in a first temperature range and a second catalyst is active in a second temperature range, and when these ranges are such that there is a range of temperatures between and above the two temperature ranges defined above in which the nitrogen oxides conversion will be low.

Furthermore, at the lowest temperatures, i.e. before the gas reaches a temperature where it is likely to be converted by one of the catalysts, there is also a lack of nitrogen oxides conversion.

By way of illustration, the formulations used for low temperatures are of the Platinum/Alumina or Platinum/Zeolite type. The temperatures for which these catalysts are the most active are from 200° C. to 250° C.

Catalysts referred to as "High-temperature" catalysts are generally active between 300° C. and 500° C. These are for example Copper/Zeolite type catalysts.

It is of course obvious that, between these two ranges, i.e. here between 250° C. and 300° C., no nitrogen oxides conversion can be performed effectively. Below 200° C. and above 500° C., the problem is the same.

There are also catalysts on which the nitrogen oxides are adsorbed as nitrates when the temperature of the gas flowing therethrough is in a certain range. These catalysts are commonly referred to as "NO$_x$ traps". The nitrates thus adsorbed can thereafter be removed either thermally or through a momentary combustion with an air/fuel ratio above 1. The latter action is well-suited for exhaust lines of lean-burn spark-ignition engines.

Patent application EP-A1-0,540,280 describes a system comprising a NO$_x$ trap, provided with a gas reheating system, followed by a nitrogen oxides reduction catalyst. Both catalysts are mounted on a line bypassing the main exhaust line. According to this document, a valve system allows to decrease the GHSV (ratio of the flow of gas to the volume of catalyst showing the contact time between the gas and the catalyst) during trap emptying phases. The conversion coefficient of the NO$_x$ on the nitrogen oxides reduction catalyst is thus improved. However, with this configuration, the part of the gaseous stream passing through the main line does not flow through the NO$_x$ reduction catalyst. Furthermore, there may be temperature ranges where the NO$_x$ trap and the NO$_x$ reduction catalyst are active, in which case the NO$_x$ will be stored in the trap whereas they might have been reduced. According to this prior art, the flow regulation is not intended to optimize the amount of gas to be reheated for the thermal elimination of the NO$_x$ previously stored, but it is rather intended to improve conversion of the nitrogen oxides on the nitrogen oxides reduction catalyst.

The aforementioned problem relative to the low conversion in certain temperature ranges, as well as others, can be solved according to the invention.

SUMMARY OF THE INVENTION

The object of the present invention is thus an assembly for eliminating nitrogen oxides (NO$_x$) present in the exhaust gas of a lean-burn diesel or sparkignition engine, said assembly being part of the exhaust line coming from the engine and comprising:

at least one nitrogen oxides conversion catalyst placed in the main exhaust line, said catalyst(s) having non-coinciding temperature ranges for which the NO$_x$ conversion is below a conversion coefficient C$_{min}$, at least one means placed upstream from the conversion catalyst(s) and intended to trap, then to release the nitrogen oxides.

According to the invention, the assembly further comprises:

at least one line bypassing the main exhaust line, containing at least one of said NO$_x$ trapping means, at least one valve intended to modulate the flow of gas between said bypass line and the main exhaust line so that the trapping means can trap said nitrogen oxides notably when the conversion catalyst(s) have a conversion coefficient below a predetermined value (C$_{min}$) and so that said NO$_x$ trapping means can release these nitrogen oxides simultaneously with a conversion.

Furthermore, the assembly according to the invention also comprises a heating means associated with at least one NO$_x$ trapping means.

In accordance with the invention, the assembly further comprises a means such as a computer intended to control at least said valve.

The assembly also advantageously comprises at least a first temperature sensor placed upstream from the DeNO$_x$ catalyst(s), said first sensor being connected to said control means to which it transmits temperature values.

The assembly further comprises at least a second temperature sensor placed upstream from the nitrogen oxides trapping means, said sensor being connected to said control means to which it sends temperature values.

Without departing from the scope of the invention, said computer is also connected to said heating means so as to actuate it as a function of the temperature values it receives.

The state of saturation of the NO$_x$ trap can be taken into account by the computer at the same time.

Said computer specifically reacts as a function of the temperatures it receives and of stored predetermined values, and it actuates the flow distribution valve accordingly.

The assembly according to the invention can also comprise a means intended to inject hydrocarbons into the exhaust line, upstream from the conversion catalyst(s), and controlled by said computer.

The object of the invention is also a process for eliminating nitrogen oxides present in the exhaust gas of a lean-burn diesel or spark-ignition internal-combustion engine, consisting in:

converting the nitrogen oxides within at least two non-coinciding temperature ranges by means of several conversion catalysts (3), adsorbing (or storing) said nitrogen oxides on at least one specific trapping means (4).

According to the process of the invention, adsorption of the nitrogen oxides is performed for at least one exhaust gas temperature range where the catalytic conversion coefficient is below a predetermined value ($C_{min}$). Desorption of the nitrogen oxides can be achieved simultaneously with the conversion of said oxides.

According to an embodiment of the invention, the adsorbed nitrogen oxides ($NO_x$) are desorbed by heating them and/or by passing the exhaust gas through said specific trapping means.

According to another embodiment of the invention, the adsorbed $NO_x$ are desorbed by heating them with a specific heating means associated with said nitrogen oxides trapping means. Opening of the valve thus defines the optimum amount of gaseous stream to be heated, which notably allows to limit the energy consumed by the heating means.

The process according to the invention further provides adsorption/desorption in a line bypassing the main exhaust line and modulation of the flow rate between the bypass line and the main line, as a function of at least one parameter linked with the temperature of the gas in the exhaust line and/or with the state of saturation of the $NO_x$ trap.

According to the invention, the temperature of the gas is measured at least at one point of the exhaust line.

The temperature is preferably measured upstream from the catalytic conversion.

In addition, the temperature upstream from the nitrogen oxides adsorption can be measured.

A computer which receives temperatures measured at least at one point of the exhaust line is preferably used.

In particular, said computer receives temperatures measured upstream from the catalytic conversion and the nitrogen oxides adsorption, and said computer accordingly controls an element intended to modulate the flow between the main exhaust line and the bypass line.

Said computer advantageously controls the exhaust gas heating means associated with the nitrogen oxides trapping means.

Furthermore, hydrocarbons are injected when the $HC/NO_x$ ratio contained in the exhaust gas upstream from the $DeNO_x$ catalyst(s) is not included in a predetermined range.

BRIEF DESCRIPTION OF THE DRAWINGS

Other features, advantages and details of the invention will be clear from reading the description hereafter, given by way of non limitative example, with reference to the accompanying drawings wherein:

FIG. 1 is a diagram showing the main elements of the invention, and

FIG. 2 shows the curves giving the conversion coefficient of the $DeNO_x$ catalysts as a function of the exhaust gas temperature.

DETAILED DESCRIPTION OF THE INVENTION

Figure 3:
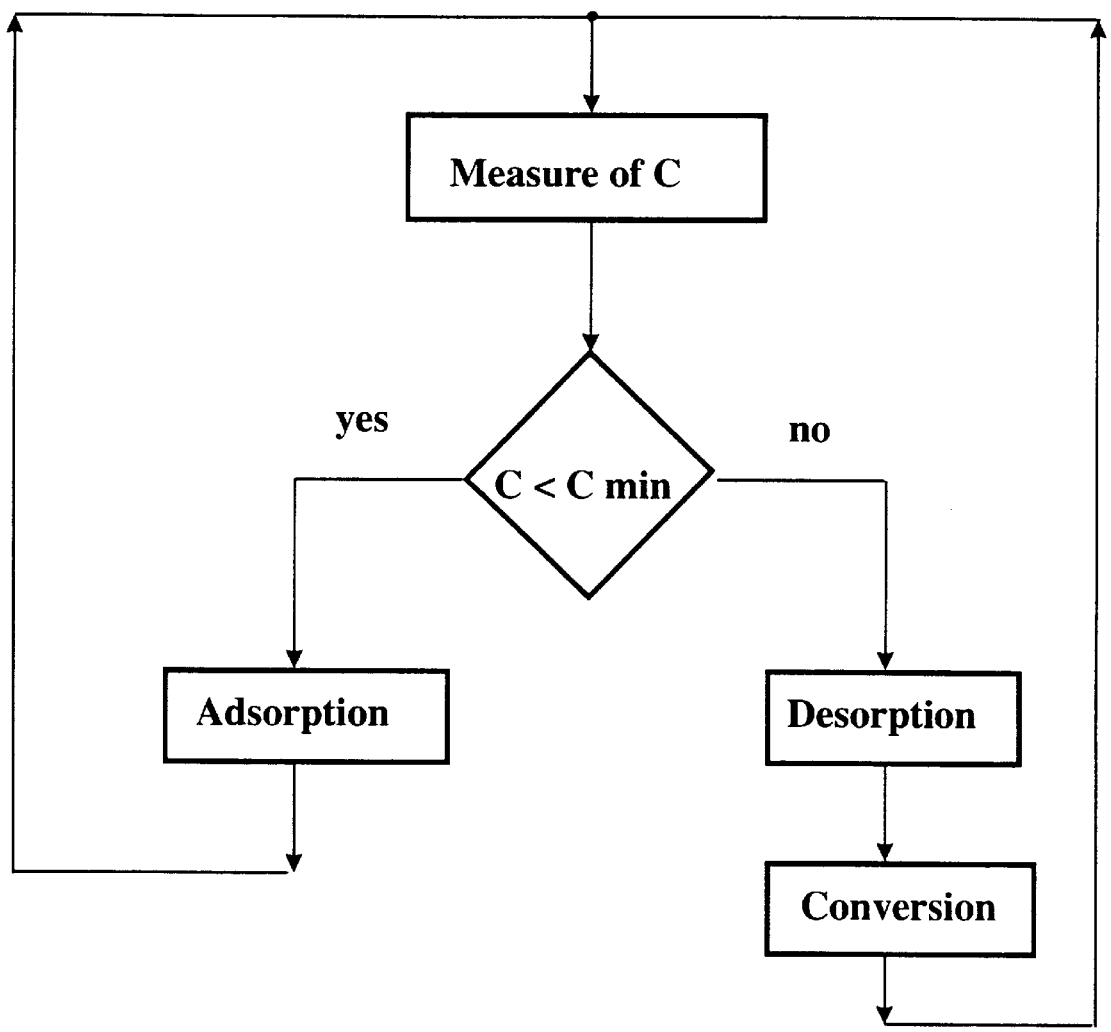
FIG. 3 is a flow chart showing a simplified way of managing the system.

FIG. 1 illustrates the main structural elements forming the nitrogen oxides elimination assembly according to the invention.

An engine 1 is schematized with its main exhaust line 2, in which the invention is implemented.

The invention relates for example to lean-burn diesel or spark-ignition engines for which $NO_x$ reduction is difficult.

One or more $DeNO_x$ catalysts 3, e.g., 3a, 3b, are placed on exhaust line 2 as it is known in the art. According to the formulation thereof, each catalyst acts for a specific exhaust gas temperature range.

Furthermore, a nitrogen oxides trapping means 4 can be added in exhaust line 2.

According to the invention, at least one line 5 bypassing main exhaust line 2 is provided, and at least one nitrogen oxides trapping means 4 ($NO_x$ adsorber) is placed in line 5.

Bypass line 5 opens into main line 2 just upstream from $DeNO_x$ catalysts 3.

Furthermore, a throttling means 6 is provided at the intersection of main line 2 and bypass line 5, on the upstream side. Valve 6 is intended to modulate the flow of gas between main line 2 which opens into catalytic converter(s) 3 and bypass line 5 equipped with $NO_x$ trapping means 4.

Means 4 can thus for example trap the nitrogen oxides when the conversion catalysts are not active enough, below a certain conversion threshold $C_{min}$ as explained more in detail hereafter.

In addition, a heating means 7 can be provided, associated with nitrogen oxides trapping means 4.

Furthermore, at least a fist temperature sensor 8 can be mounted on main exhaust line 2.

Said sensor 8 is preferably placed just upstream from conversion catalyst(s) 3, in the vicinity of the outlet of bypass line 5.

Sensor 8 is connected to a control and/or computing means such as a microprocessor 9.

Computing means 9 can furthermore receive the temperature of the exhaust gas at the inlet of $NO_x$ trapping means 4 by means of a second temperature sensor 10 placed at this point of bypass line 5.

By means of the information received and of stored values, computer 9 reacts on several elements. The arrowed solid lines in FIG. 1 represent the information received by computer 9. It may be noted that said computer 9 uses measured or calculated data (speed, temperatures, pollutant maps, state of saturation of the $NO_x$ trap) relative to the engine running and globally shown by line 12 in FIG. 1.

The dotted lines in FIG. 1 represent the control actions of computer 9 on certain elements. Computer 9 thus acts on flow regulation valve 6 between main line 2 and bypass line 5.

Furthermore, according to the information received, the computer can actuate heating means 7.

Without departing from the scope of the present invention, the computer can control a means 11 intended to inject a certain amount of hydrocarbons in main line 2.

Operation of the assembly described above is described hereunder in connection with FIG. 2.

In the graph of FIG. 2, the $NO_x$ conversion coefficient (C) of the catalyst(s) such as 3 is given as a function of the temperature (T) of the gas taken just upstream from said catalysts 3.

According to this example, two catalysts of different formulation are used: one gives curve A, i.e. it is sufficiently active between $T_1$ and $T_2$. It is a catalyst whose formulation allows to react at low temperatures.

The second catalyst reacts according to curve B, i.e. for gases whose temperatures range between $T_3$ and $T_4$, $T_3$ being greater than $T_2$.

The values $T_1$, $T_2$, $T_3$ and $T_4$ correspond to a predetermined conversion coefficient $C_{min}$ which is an acceptable minimum value.

In the graph of FIG. 2, $T_{st1}$ and $T_{st2}$ denote respectively the boundaries of the temperature range in which the $NO_x$ trap is likely to adsorb the nitrogen oxides.

For conversion coefficients below a given threshold, such as $C_{min}$ in FIG. 2, a problem usually comes up. The present invention allows to solve it.

$NO_x$ Storage Stage

When the exhaust gas temperature is in a range where the conversion coefficient of the $DeNO_x$ catalyst is below threshold $C_{min}$ and where $NO_x$ adsorber 4 is active, all the exhaust gases are diverted into line 5 containing $NO_x$ adsorber 4: this occurs, according to FIG. 2, between $T_{st1}$ and $T_1$, between $T_2$ and $T_3$ and between $T_4$ and $T_2$.

According to certain parameters such as the flow of gas passing through trap 4, the $NO_x$ content of the gas, the adsorption efficiency of the trap, it is possible to estimate the amount of $NO_x$ adsorbed on trap 4 and to determine whether it is saturated. It would also be possible to directly determine whether the trap is satured by means of a $NO_x$ probe.

$NO_x$ Elimination Stage

Desorption of the $NO_x$ trapped on $NO_x$ adsorber 4 is performed thermally. The thermal energy required for this desorption is provided by either the exhaust gas itself or, if the thermal energy of the exhaust gas is not sufficient, by an additional heating system such as means 7.

When one decides to eliminate the $NO_x$ accumulated on trap 4 because the latter is saturated or because the elimination conditions are optimum and the exhaust gas flowing through $DeNO_x$ catalyst 3 are at a temperature allowing a sufficient $NO_x$ conversion coefficient, part or all of the exhaust gas flow passes through the bypass line. If the temperature of the exhaust gas at the level of $NO_x$ trap 4 is not sufficient to ensure the $NO_x$ removal, heating means 7 then allows to reach a sufficient temperature level allowing removal. Valve 6 then controls the flow passing through bypass line 5 so that only part of the gas is reheated. It thus allows to limit the energy necessary to heating means 7 while providing elimination of the $NO_x$ trapped in means 4.

$NO_x$ Reduction Stage

Reduction of the $NO_x$ on $DeNO_x$ catalyst 3 depends on certain parameters such as the temperature, the GHSV (ratio of the volume flow rate of gas flowing through the catalyst to the volume of catalyst), the $HC/NO_x$ ratio. If the amount of unburned hydrocarbons (HC) resulting from the combustion of the engine is not sufficient, an additional hydrocarbon injection can be performed so as to have optimum $NO_x$ reduction conditions.

In an internal-combustion engine, several injection zones can be considered:
- upstream from the intake valve, so that all or part of the hydrocarbons injected gets to the exhaust in the form of unburned hydrocarbons,
- in the combustion chamber, before or after the main injection, so that all or part of these hydrocarbons gets to the exhaust in the form of unburned hydrocarbons,
- in the exhaust line upstream from $DeNO_x$ catalyst 3.

During $NO_x$ reduction stages on $DeNO_x$ catalyst 3, all or part of the gas passes into main line 2 prior to flowing through $DeNO_x$ catalyst 3.

The $NO_x$ reduction stage is a complementary processing necessary for elimination of the $NO_x$ coming directly from the engine and/or coming from $NO_x$ trap 4.

A simplified way of managing the system described above is shown in FIG. 3 and explained hereafter.

Computer 9 determines whether the conversion coefficient C of $DeNO_x$ catalyst 3 is greater than $C_{min}$ or not, as a function of measured or calculated values.

If the conversion coefficient is above $C_{min}$, the $HC/NO_x$ ratio is adjusted (if necessary) by means of an additional hydrocarbon injection in order to optimize the nitrogen oxides conversion coefficient C. Simultaneously, as a function notably of the state of saturation of the trap, one decides or not to remove the $NO_x$ which have been previously stored on $NO_x$ trap 4.

Within the scope of an elimination process, computer 9 manages the opening of valve 6 as well as heating means 7 so as to obtain a temperature T10, upstream from the trap, higher than temperature from which the $NO_x$ can be thermally desorbed and a mixture temperature T8 in the activity range of the $DeNO_x$ catalyst(s).

If the conversion coefficient C is lower than coefficient $C_{min}$ and the (estimated or measured) temperature of the gas at the level of the $NO_x$ trap ranges between $T_{st1}$ and $T_{st2}$, all of the exhaust gas flow passes into bypass line 5 and into the $NO_x$ trap. On the other hand, if this temperature is higher than $T_{st2}$ and the conversion coefficient C is lower than $C_{min}$, all of the exhaust gas flow passes through main line 2.

We claim:

1. An assembly for elimination of nitrogen oxides ($NO_x$) present in exhaust gas of a lean-burn diesel or spark-ignition engine, said assembly being part of a main exhaust line coming from the engine and comprising:
    a plurality of nitrogen oxides conversion catalysts placed in said main exhaust line, said conversion catalysts having non-coinciding temperature ranges for which the $NO_x$, conversion is below a certain conversion coefficient ($C_{min}$),
    at least one $NO_x$ trapping means placed upstream from said conversion catalysts for trapping, then releasing nitrogen oxides,
    at least one bypass bypassing said main exhaust line and containing said at least one $NO_x$ trapping means,
    at least one valve to modulate the flow of gas between said bypass line and said main exhaust line so that said at least one $NO_x$ trapping means can trap said nitrogen oxides notably when said conversion catalysts have a conversion coefficient below said predetermined value ($C_{min}$) and so that said at least one $NO_x$ trapping means can release said nitrogen oxides simultaneously with a conversion.

2. An assembly as claimed in claim 1, further comprising associated said at least one $NO_x$ trapping means.

3. An assembly as claimed in claim 2, further comprising control means to control said at least one valve.

4. An assembly as claimed in claim 3, further comprising at least a first temperature sensor placed upstream from said conversion catalysts, said first temperature sensor being connected to said control means to which it transmits temperature values.

5. An assembly as claimed in claim 4, further comprising at least a second temperature sensor placed upstream from nitrogen oxides trapping means, said second sensor being connected to said control means to which it sends temperature values.

6. An assembly as claimed in any one of claim 3, characterized in that said control means is also connected to said so as to actuate it as a function notably of the temperature values it receives and/or of the state of saturation of the $NO_x$ trap.

7. An assembly as claimed in any one of claim 3, characterized in that said control means reacts as a function of the temperatures it receives and as a function of stored predetermined values, and actuates said at least one valve accordingly.

8. An assembly as claimed in claim 3, further comprising hydrocarbon injection means to inject hydrocarbons into said main exhaust line upstream from said conversion catalysts, said hydrocarbon injection means being controlled by said control means.

9. A process for eliminating nitrogen oxides present in the exhaust gas of a lean-burn diesel or spark-ignition internal-combustion engine, said process comprising:

converting nitrogen oxides within at least two non-coinciding temperature ranges by means of several conversion catalysts in a main exhaust line, adsorbing (or storing) said nitrogen oxides on at least one specific trapping means in a bypass line bypassing the main exhaust line, characterized in that adsorption of the nitrogen oxides is performed for at least one exhaust gas temperature range wherein the catalytic conversion coefficient is lower than a predetermined value ($C_{min}$) and in that desorption of the nitrogen oxides can be performed simultaneously with the conversion of said nitrogen oxides.

10. A process as claimed in claim 9, characterized in that the adsorbed nitrogen oxides are desorbed by heating them and/or by passing the exhaust gas through said specific trapping means (4).

11. A process as claimed in any one of claim 9, characterized in that the adsorbed $NO_x$ are desorbed by heating them with a specific heating means associated with said nitrogen oxides trapping means (4).

12. A process as claimed in claim 9, characterized in that the exhaust gas flow is modulated between the bypass line and the main exhaust line as a function of at least one parameter linked with the temperature of the gas in the exhaust line and/or with the state of saturation of the $NO_x$ trap.

13. A process as claimed in claim 12, characterized in that the temperature of the gas is measured at least at one point of the exhaust line.

14. A process as claimed in claim 13, characterized in that the temperature is measured before the catalytic conversion.

15. A process as claimed in any one of claim 12, characterized in that the temperature is measured upstream from the nitrogen oxides adsorption.

16. A process as claimed in any one of claim 9, characterized in that a computer receiving temperatures measured at least at one point of the exhaust line is used.

17. A process as claimed in claim 16, characterized in that said computer receives temperatures measured upstream from the catalytic conversion and upstream from the nitrogen oxides adsorption, and in that said computer controls accordingly an element intended to modulate the flow between the main exhaust line and the bypass line.

18. A process as claimed in claim 16, characterized in that said computer (9) controls exhaust gas heating means associated with nitrogen oxides trapping means.

19. A process as claimed in any one of claim 9, characterized in that hydrocarbons are injected when the $HC/NO_x$ ratio contained in the exhaust gas upstream from catalytic conversion (3) is not included in a predetermined range.

* * * * *